US008947257B2

(12) United States Patent
    Ree (10) Patent No.: US 8,947,257 B2
(45) Date of Patent: Feb. 3, 2015

(54) SYSTEMS, METHODS, AND APPARATUSES FOR REDUCING NETWORK CONGESTION IN A SMART UTILITY METER SYSTEM

(75) Inventor: Bradley Richard Ree, Cumming, GA (US)

(73) Assignee: General Electric Company, Schenectady, NY (US)

( * ) Notice: Subject to any disclaimer, the term of this patent is extended or adjusted under 35 U.S.C. 154(b) by 853 days.

(21) Appl. No.: 13/044,079

(22) Filed: Mar. 9, 2011

(65) Prior Publication Data

US 2012/0229296 A1    Sep. 13, 2012

(51) Int. Cl.
| G08B 23/00 | (2006.01) |
| G08C 15/06 | (2006.01) |
| G08C 19/22 | (2006.01) |
| H04Q 9/00 | (2006.01) |
| G01R 15/00 | (2006.01) |
| G01D 4/00 | (2006.01) |
| H04W 48/18 | (2009.01) |
| H04W 88/06 | (2009.01) |

(52) U.S. Cl.
    CPC ............ *G01D 4/002* (2013.01); *H04W 48/18* (2013.01); *H04W 88/06* (2013.01); *Y02B 90/241* (2013.01); *Y04S 20/32* (2013.01); *Y04S 20/42* (2013.01); *Y02B 90/246* (2013.01)
    USPC ............ 340/870.02; 340/870.01; 340/870.07; 702/57

(58) Field of Classification Search
    None
    See application file for complete search history.

(56) References Cited

U.S. PATENT DOCUMENTS

| 5,699,276 | A | 12/1997 | Roos |
| 5,923,269 | A | 7/1999 | Shuey et al. |
| 2004/0004555 | A1 | 1/2004 | Martin |
| 2005/0132115 | A1 | 6/2005 | Leach |
| 2009/0138099 | A1* | 5/2009 | Veillette ..................... 700/22 |
| 2009/0315699 | A1 | 12/2009 | Satish et al. |
| 2010/0195659 | A1* | 8/2010 | Karaoguz et al. ............. 370/400 |
| 2012/0063334 | A1* | 3/2012 | Drake ........................ 370/252 |

FOREIGN PATENT DOCUMENTS

WO           98/10299 A1   3/1998

OTHER PUBLICATIONS

Office Action issued in connection with NZ Patent Application No. 598637, Mar. 14, 2012.
European Search Report and Written Opinion issued in connection with corresponding EP Application No. 12157869.4 dated Feb. 13, 2014.

* cited by examiner

*Primary Examiner* — Mohammad Ghayour
*Assistant Examiner* — Jerold Murphy
(74) *Attorney, Agent, or Firm* — Sutherland Asbill & Brennan LLP (57) ABSTRACT

Systems, methods, and apparatuses for reducing network congestion in a smart utility meter system are provided. The systems, methods, and apparatuses may include providing, for a utility meter, a first communications interface for communicating with a first network; providing, for the utility meter, a second communications interface for communicating with a second network different from the first network; receiving or generating, by the utility meter, information having a destination; selecting either the first communications interface or the second communications interface; and delivering the information to the destination via the selected communications interface.

16 Claims, 7 Drawing Sheets

SYSTEMS, METHODS, AND APPARATUSES FOR REDUCING NETWORK CONGESTION IN A SMART UTILITY METER SYSTEM

FIELD OF THE INVENTION

Embodiments of the invention relate generally to utility meters, and more specifically to systems, methods, and apparatuses for reducing network congestion in a smart utility meter system.

BACKGROUND OF THE INVENTION

Automatic meter reading networks are currently widely deployed. These networks typically are meshed based systems, in which the meter can generate data or pass packets through the network. One issue is that a "bottleneck" in the network may occur when a particular meter may have to carry most of the traffic for the system. Another issue that mesh networks face is inefficiency of bandwidth. Since packets need to be broadcast multiple times to get from a source to a take out point, the overall bandwidth that a single packet requires is much larger than a single transmission. Accordingly, there is an opportunity for systems, methods, and apparatuses for reducing network congestion in a smart utility meter system.

BRIEF DESCRIPTION OF THE INVENTION

Some or all of the above needs and/or problems may be addressed by certain embodiments of the invention. Embodiments of the invention may include systems, methods and apparatuses for reducing network congestion in a smart utility meter system. According to one embodiment of the invention, there is disclosed a utility meter apparatus. The utility meter apparatus may include a first communications interface for communicating with a first network, a second communications interface for communicating with a second network different from the first network, and at least one processor in communication with the first and second communications interfaces. The at least one processor may be configured to: receive or generate information having a destination, select either the first communications interface or the second communications interface, and deliver the information to the destination via the selected communications interface.

According to another embodiment of the invention, there is disclosed a method. The method may include providing, for a utility meter, a first communications interface for communicating with a first network; providing, for the utility meter, a second communications interface for communicating with a second network different from the first network; receiving or generating, by the utility meter, information having a destination; selecting either the first communications interface or the second communications interface; and delivering the information to the destination via the selected communications interface.

According to another embodiment of the invention, there is disclosed a system. The system may include a server computer, and a plurality of utility meters in communication with the server computer. Each utility meter may include: a first communications interface for communicating with a first network; a second communications interface for communicating with a second network different from the first network; and at least one processor in communication with the first and second communications interfaces. The at least one processor may be configured to: receive or generate information having a destination, select either the first communications interface or the second communications interface, and deliver the information to the destination via the selected communications interface.

Additional systems, methods, apparatuses, features, and aspects are realized through the techniques of various embodiments of the invention. Other embodiments and aspects of the invention are described in detail herein and are considered a part of the claimed invention. Other embodiments and aspects can be understood with reference to the description and the drawings.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are systems, methods, and apparatuses for reducing network congestion in a smart utility meter system. In an example embodiment of the invention, a smart utility meter may have at least two network/communications interfaces, with each network/communications interface having respective routes to one or more common network components such as a utility server computer. In this regard, a smart utility meter in accordance with an example embodiment may utilize either a first or a second of the at least two network/communications interfaces, depending upon network congestion or performance. In this way, when a first network/communications interface, or the network connected thereto, is experiencing network congestion or undesirable performance, information can be delivered, routed, transmitted, or communicated via the second network/communications interface or yet another network/communications interface available at the smart utility meter.

In an example embodiment of the invention, a first network/communications interface may be connected to an advanced meter infrastructure (AMI) network, which may, for example, include a mesh network comprising one or more neighborhood area networks (NANs). The AMI network may have connectivity to the Internet or another wide area network from which a utility server computer or other desired network destination (e.g., another utility meter, gateway, NAN, etc.) is accessible. On the other hand, a second network/communications interface may be connected to a local area network/home area network, which may include a home Internet router with access to the Internet. The utility server computer or desired network destination may be accessible via the Internet. Alternatively, the second network/communications interface may be a cellular network, a satellite network, or virtually any other network different from the AMI network, but which likewise has connectivity to a utility server computer or the desired network destination. Thus, overall network performance or congestion in an AMI network may be improved by utilizing the second network/communications interface to deliver, route, transmit, or communicate information to or with the utility server computer or the desired network destination.

Various embodiments of the invention may include one or more special purpose computers, systems, and/or particular machines that facilitate network communications with one or more smart utility meters and/or other network devices. A special purpose computer or particular machine may include a wide variety of different software modules as desired in various embodiments. As explained in greater detail below, in certain embodiments, these various software components may be utilized to facilitate communications between one or more network devices and one or more smart utility meters. Additionally, these various software components may be utilized to support the management of peak loads for a customer location such as a home.

Certain embodiments of the invention described herein may have the technical effect of a utility meter utilizing alternate network/communications interface(s) to reduce network congestion or otherwise improve network performance. In this regard, the utility meter can have access to various routes to a particular utility server computer or a desired network destination to improve the flexibility and performance of an AMI network or other network to which the utility meter is in communication with.

Figure 1:
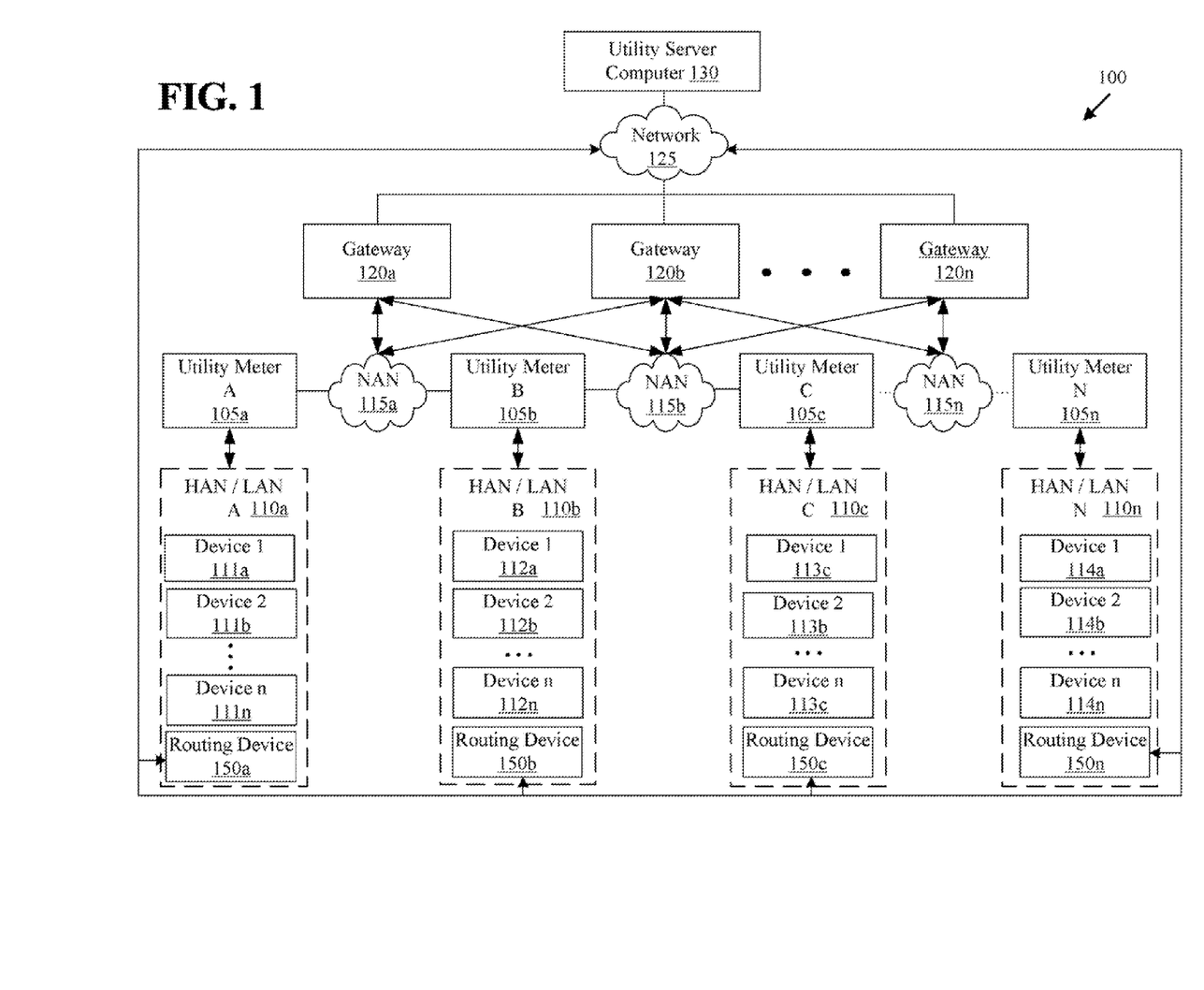
FIG. 1 is a block diagram of one example utility meter system that supports reducing network congestion, according to an illustrative embodiment of the invention.

FIG. 1 is a block diagram of one example utility meter system 100 that supports reducing network congestion, according to an illustrative embodiment of the invention. The system 100 illustrated in FIG. 1 may include a plurality of smart utility meters 105*a-n*, according to an example embodiment of the invention. Each smart utility meter 105*a-n* may be in communication with one or more home area networks (HANs) or local area networks (LANs) 110*a-n* using wired communications (e.g., power line carrier (PLC) communications, serial communications link, USB, Ethernet, fiber optic, etc.) or wireless communications (e.g., Zigbee, Global System for Mobile Communications (GSM), Wi-Fi, Worldwide Interoperability for Microwave Access (WiMAX), General Packet Radio Service (GPRS), Bluetooth, cellular, 3G, 4G, 802.11x, radio frequency (RF) mesh communications, etc.). Where a LAN is associated with one or more customer homes, the LAN may be referred to as a HAN. For convenience, the example HAN/LAN 110*a-n* described herein will be understood to encompass either or both a HAN or a LAN.

Each HAN/LAN 110*a-n* may include or be in communication with one or more network devices, which may include one or more home devices such as lights, appliances (e.g., refrigerator, stove, oven, dishwasher, clothes washer, clothes dryer, coffee maker, etc.), televisions, security systems, air conditioning and/or heating units, home Internet modems and routers, and the like, according to an example embodiment of the invention. For example, utility meter 105*a* can communicate with one or more network devices 111*a-n* via HAN/LAN 110*a*. Likewise, utility meter 105*b* can communicate with one or more network devices 112*a-n* via HAN/LAN 110*b*. Utility meter 105*c* can communicate with one or more network devices 113*a-n* via HAN/LAN 110*c*. Similarly, utility meter 105*n* can communicate with one or more network devices 114*a-n* via HAN/LAN 110*n*. It will be appreciated that one or more of the network devices 111*a-n*, 112*a-n*, 113*a-n*, 114*a-n* may receive a metered commodity (e.g., electricity, water, gas, etc.) via a respective utility meter 105*a-n*. It will also be appreciated that one or more of the network devices 111*a-n*, 112*a-n*, 113*a-n*, 114*a-n* may include a routing device, which may include a gateway device for communications with a wide area network (WAN) (e.g., the Internet) such as WAN 125. For example, one of the network devices 111*a-n*, 112*a-n*, 111*a-n*, 114*a-n* in respective HANs/LANs 110*a-n* may be respective routing devices 150*a-n*. In addition, each smart utility meter 105*a-n* may be in further communication with one or more neighborhood area networks (NANs) 115*a-n* via wired or wireless communications similar to those described herein. These NANs 115*a-n* may provide further connectivity to other NANs and wide area networks (WANs) 125 (e.g., the Internet, a cellular network, a satellite-based network, etc.) via one or more gateway computers 120*a-n*. These NANs 115*a-n* and/or WANs 125 can enable communications between or among utility meters 105*a-n*, utility server computers 130, and/or one or more other computers associated with a utility company. It will be appreciated that the NANs 115 and/or WAN 125 can be provided or accessed via wired and/or wireless communications, and collectively create an interconnected network. For example, a utility meter 105*a-n* can communicate with a utility server computer 130 via a gateway computer 120*a-n* and/or a WAN 125. It will be appreciated that in some example embodiments, the WAN 125, gateway computers 120*a-n*, and the NANs 115*a-n* may be part of a same network such as the Internet. In an example embodiment of the invention, the utility meter 105*a-n* may also be in communication with a WAN 125 or other networks without an intermediate NAN 115*a-n*. Indeed, the NANs 115*a-n* and WANs 125 may form an AMI network, which may be a wireless mesh network connecting various smart utility meters 105*a-n*, utility server computers 130, and/or one or more other computers associated with a utility company.

Many different communication paths between network devices may be available via the various combinations of HANs/LANs 110*a-n*, NANs 115*a-n*, gateway computers 120*a-n*, and WAN 125. For example, utility server computer 130 or other computers/processors associated with the utility company or another entity may communicate with various utility meters 105*a-n* through direct or indirect routes involving various combinations of WAN 125, gateway computers 120*a-n*, and other utility meters 105*a-n*. For example, utility server computer 130 could communicate with utility meter 105*h*, HAN/LAN 110*b*, and/or any devices 112*a-n* associated with HAN/LAN 110*b* using any combination of WAN 125, gateway computers 120*a-n*, and any other utility meters 105*a*, 105*c*, and/or 105*n*. It will be appreciated that many variations of routes and alternate routes are available without departing from example embodiments of the invention.

A utility meter 105*a-n* may be any suitable utility meter that may be connected to a commodity metering and distribution system, such as an electrical meter connected to a power distribution grid that includes any number of power lines. A wide variety of suitable electrical meters may be utilized as desired in various embodiments, such as a single-phase meter or a three-phase meter. A utility meter 105*a-n* may be configured to measure an amount of electrical energy (e.g., kilowatt hours, etc.) or electrical power that is supplied to an associated location, residence, business, household, or machine. In another embodiment of the invention, the utility meter 105 can also be associated with the metering and distribution of commodities other than electricity such as water, gas, and the like. Thus, the utility meter 105a-n may be configured to meter and supply or distribute commodities to an associated location, residence, business, household, or machine, including an associated network device 111a-n, 111a-n, 113a-n, 114a-n.

In certain embodiments, the utility meter 105a-n may be a smart meter or an advanced meter that is configured to identify commodity consumption in relatively greater detail than a conventional meter. For example, a smart utility meter 105a-n may facilitate real-time or near real-time readings, commodity outage notifications, and/or commodity quality monitoring. Additionally, as desired, a smart utility meter 105a-n may communicate measurements data, calculations, and/or other information to one or more recipients, such as a utility server computer 130 of a utility company or a smart meter data processing system. Furthermore, as described herein, a smart utility meter 105a-n may be configured to manage associated network/communications interfaces in order to reduce network congestion, according to an example embodiment of the invention.

As desired, embodiments of the invention may include a system 100 with more or less than the components illustrated in FIG. 1. Additionally, certain components of the system 100 may be combined or omitted in various embodiments of the invention. The system 100 of FIG. 1 is provided by way of example only, as appreciated by those of ordinary skill in the art.

Figure 2:
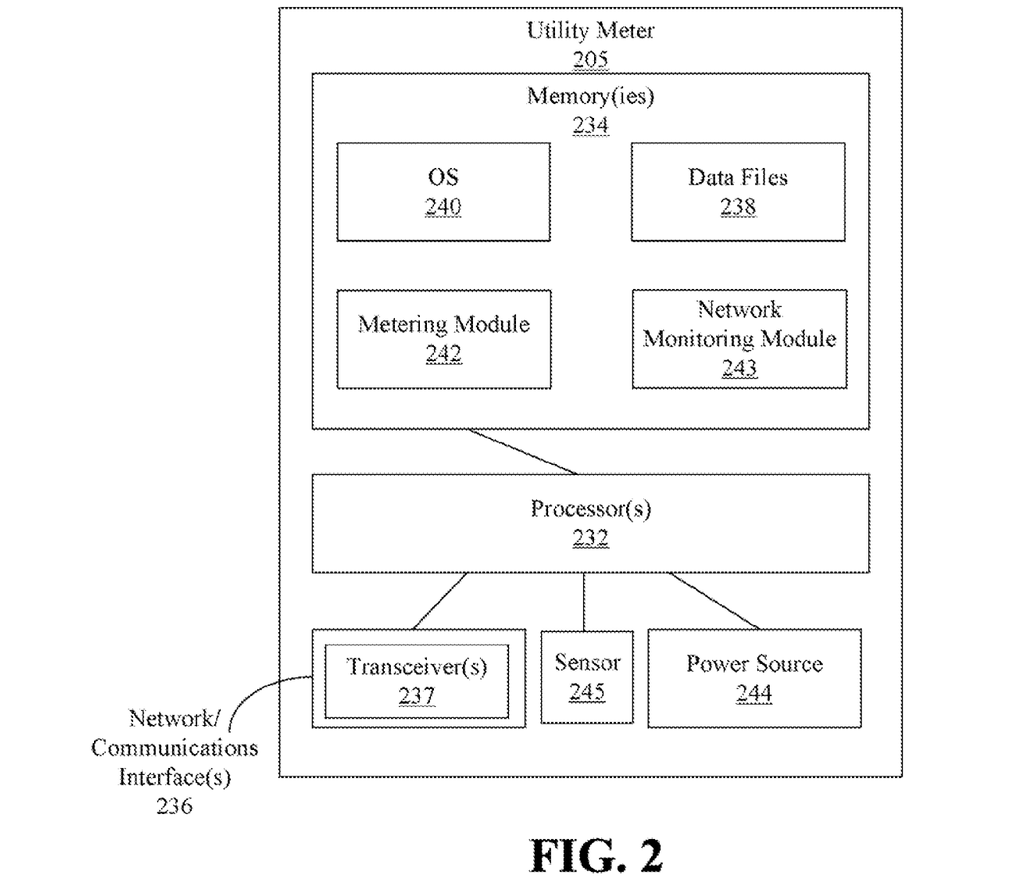
FIG. 2 illustrates an example utility meter, according to an example embodiment of the invention.

FIG. 2 illustrates an example utility meter 205, according to an example embodiment of the invention. The utility meter 205 of FIG. 2 may be an example implementation for any one of the utility meters 105a-n of FIG. 1. As shown in FIG. 2, an example utility meter 205 may include any number of suitable computer processing components that facilitate the operation of the utility meter and/or the provision of a utility service and/or commodity (e.g., electricity, water, gas, etc.) to a location, including a customer home location. Examples of suitable processing devices that may be incorporated into a utility meter 205 include, but are not limited to, application-specific circuits, microcontrollers, minicomputers, other computing devices, and the like. As such, a utility meter 205 may include any number of processors 232 that facilitate the execution of computer-readable instructions. By executing computer-readable instructions, the utility meter 205 may include or form a special purpose computer or particular machine that facilitates the provision of a utility service and/or the provision of a commodity to a location.

In addition to one or more processors 232, the utility meter 205 may include one or more memory devices 234 and a plurality of network and/or communications interfaces 236. The one or more memory devices 234 or memories may include any suitable memory devices, for example, caches, read-only memory devices, random access memory devices, magnetic storage devices, etc. The one or more memory devices 234 may store data, executable instructions, and/or various program modules utilized by the utility meter 205, for example, data files 238, an operating system ("OS") 240, a metering module 242, and/or a network monitoring module 243. The data files 238 may include, for example, stored data associated with the operation of a utility meter 205, stored data associated with measurements and/or readings taken by the utility meter 205, utility meter configuration information, stored messages and/or alerts, and/or stored commodity management, usage, and/or distribution data. The data files 238 can provide further information regarding network conditions associated with one or more network/communications interfaces 236 in support of the processes for reducing network congestion or improving network performance, as described herein.

The OS 240 may include executable instructions and/or program modules that facilitate and/or control the general operation of the utility meter 205. For example, the OS 240 may facilitate the execution of other software programs and/or program modules by the processors 232. The metering module 242 may be configured to determine and record, perhaps in data files 238 or other data storage, commodity usage or distribution to an associated location, residence, business, household, or machine, including an associated network device 111a-n, 112a-n, 113a-n, 114a-n. Sensor 245 may be utilized by the metering module 242 to measure, sense, or determine commodity usage or distribution, according to an example embodiment of the invention. The network monitoring module 243 may be configured to determine network congestion and/or network performance, and may be further configured to select one of the plurality of network/communications interfaces for utilization in order to reduce network congestion or improve network performance, as described herein.

The plurality of network/communications interfaces 236 associated with the utility meter 205 can include at least a first interface and a second interface. For example, the first interface may be a NAN interface or other AMI network interface, while the second interface may be a HAN/LAN interface (or alternatively, a cellular interface, satellite interface, power line carrier (PLC) communications interface, etc.). In this example, the NAN interface can be used for communicating or connecting with one or more NANs such as NANs 115a-n of FIG. 1, perhaps to communicate with the utility server computer 130 or another desired network destination (e.g., another utility meter 105a-n). On the other hand, the HAN/LAN interface can be used for communicating or connecting with one or more HANs/LANs such as HANs/LANs 110a-n of FIG. 1 Because one or more HANs/LANs 110a-n may include network devices, such as Internet routers or other network routers, the HAN/LAN interface may be able to access these Internet routers or other network routers for communicating information via the Internet, a WAN, or another network to the utility server computer 130 or another desired network destination (e.g., another utility meter 105a-n).

In this regard, a utility meter 205 may receive data from and/or communicate data to other components of the system 100 according to various routes provided by the network/communications interfaces 236. The plurality of interfaces 236, including the HAN/LAN interface and/or the NAN interface, can be implemented as one or more respective network cards, adaptors, radios, or transceivers 237 for communicating over wired interfaces (e.g., power line carrier communications, serial communications link, USB, Ethernet, fiber optic, etc.) and/or wireless interfaces (e.g., ZigBee, GSM, Wi-Fi, WiMAX, Bluetooth, GRPS, cellular, 3G, 4G, 802.11x, RF mesh communications, etc.). It will be appreciated that the one or more network/communications interfaces 236 can also be utilized for communicating or connecting with one or more other network devices or networks, including WAN 125 of FIG. 1, without departing from example embodiments of the invention.

The utility meter 205 may typically receive a commodity from a connected commodity line, grid and/or source, and likewise meter and distribute the commodity to an associated location, residence, business, household, or machine, including an associated network device 111a-n, 112a-n, 113a-n, 114*a-n*. Additionally, as desired in certain embodiments, the utility meter 205 may include any number of suitable power sources 244, which can include wired power supplies and solar power cells, as well as back-up power supplies such as one or more batteries, fuel cells, or one or more super capacitors.

Figure 3:
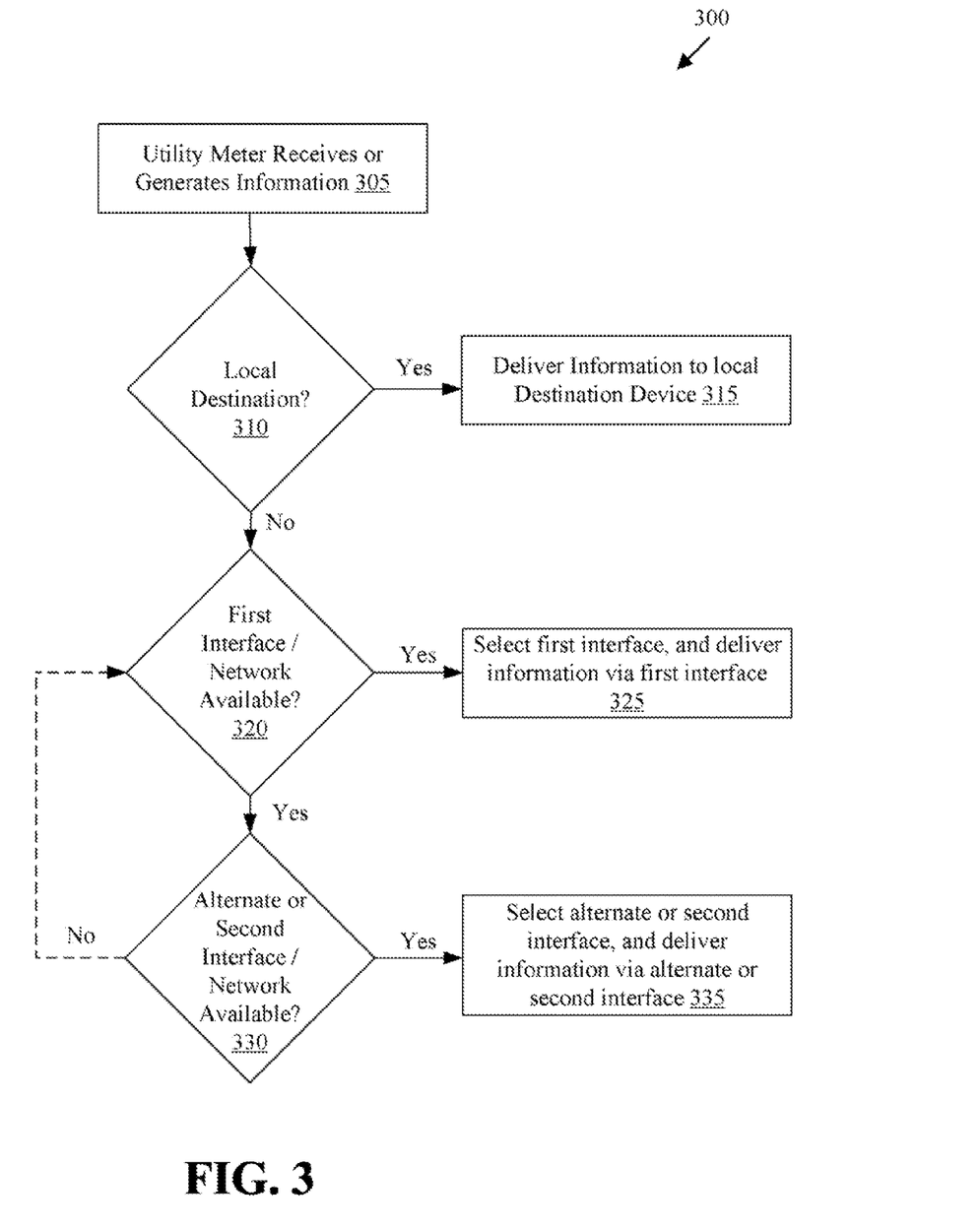
FIG. 3 is a flow diagram illustrating an example method for reducing network congestion in a smart utility meter system, according to an example embodiment of the invention.

FIG. 3 is a flow diagram illustrating an example method 300 for reducing network congestion in a smart utility meter system, according to an example embodiment of the invention. In certain embodiments, the operations of the method 300 may be performed by the example utility meter 205 of FIG. 2. For example, the operations of the method 300 may be implemented as computer-executable instructions stored in data files 238 and executed by a network monitoring module 243, according to an example embodiment of the invention. Because the example utility meter 205 of FIG. 2 is representative of any of the utility meters 105*a-n* of FIG. 1, it will be appreciated that the operations of the method 300 of FIG. 3 can likewise be performed by any of the utility meters 105*a-n*.

Figure 4:
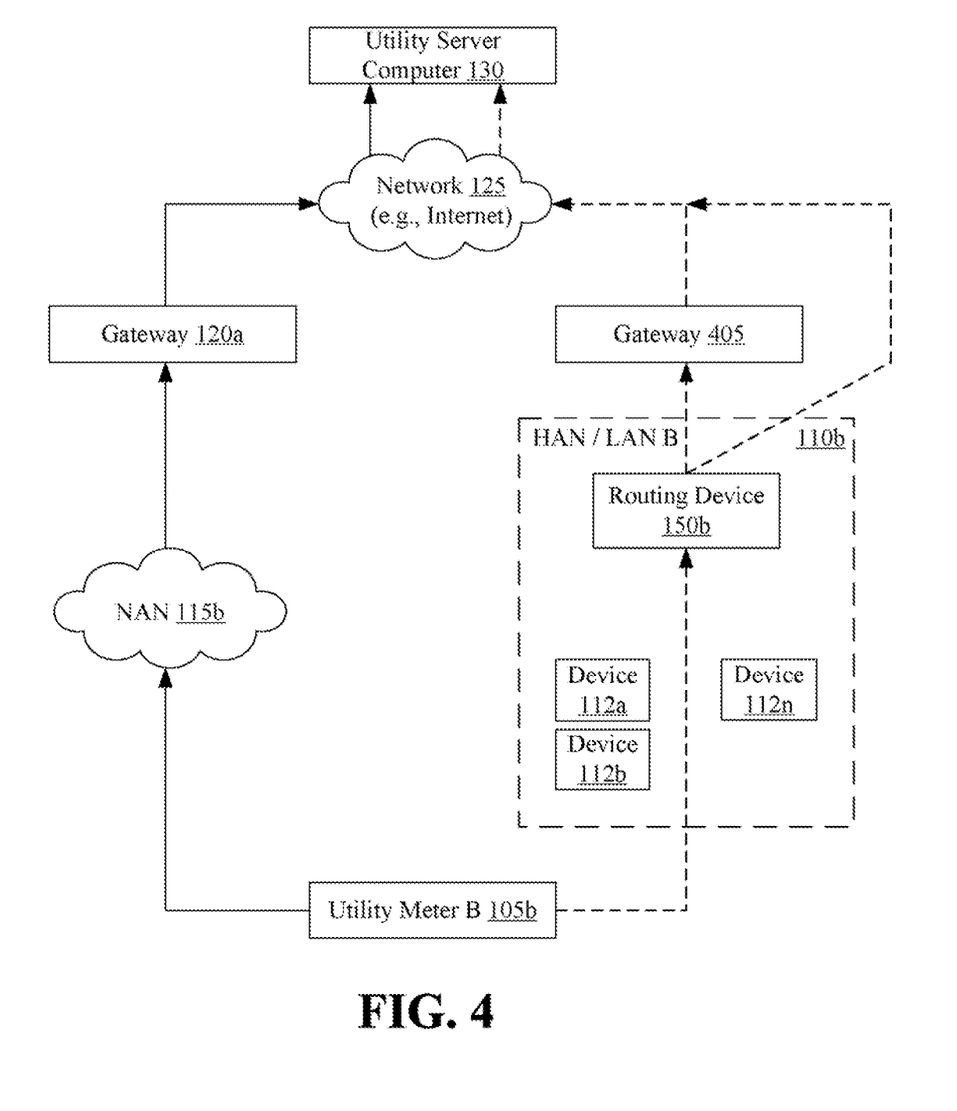
FIG. 4 shows an example data flow involving an example utility meter, according to an example embodiment of the invention.

For illustrative purposes, the method 300 of FIG. 3 will be discussed in conjunction with the example utility meter configuration of FIG. 4. In particular, FIG. 4 shows an example data flow involving an example utility meter such as the utility meter 105*b* of FIG. 1. The utility meter 105*b* may have at least two network/communications interfaces. A first network/communications interface may enable the utility meter 105*b* to communicate with or access NAN 115*a* and/or NAN 115*b*, which may provide direct or indirect connectivity for communications with various network components and devices, including other utility meters, gateway computers 120*a*, 120*b*, WAN 125, and utility server computer 130. On the other hand, a second network/communications interface may enable the utility meter 105*b* to access HAN/LAN 110*b*, and the associated devices, including one or more of network devices 112*a-n*. When one or more network devices 112*a-n* are located in, near, or around a customer home, they may be referred to as home devices. These network devices 112*a-n* may include lights, appliances (e.g., refrigerator, stove, oven, dishwasher, clothes washer, clothes dryer, coffee maker, etc.), televisions, security systems, air conditioning and/or heating units, home Internet modems and routers. It will be appreciated that network devices 112*a-n* can also be located outside of a customer home or location without departing from example embodiments of the invention. According to an example embodiment of the invention, one of the network devices 112*a-n* may include a routing device 410, which may provide access to WAN 125 such as the Internet, either directly or via one or more gateway computers 405 or other intermediate computers. For example, routing device 41.0 may be a cable or DSL modem that enables customers to access the Internet via a home or other computer. In an example embodiment of the invention, the routing device 410 may be owned by a customer, an Internet service provider, or another network carrier provider, although the routing device 410 could be owned or provided by a utility company as well.

Turning now to FIGS. 3 and 4, at block 305, a utility meter 105*b* may receive or generate a packet, frame, or other information. The packet, frame, or other information may be for delivery or transmission to a destination directly accessible via the utility meter 105*b*, such as for a device 112*a-n* or routing device 410 in HAN/LAN 110*b*. Otherwise, the packet, frame, or other information may be for transmission or retransmission to a utility server computer 130 or another desired network destination. For example, the packet, frame, or other information may have been received by the utility meter 105*b* from another utility meter for retransmission to the utility server computer 130 or another network destination. Alternatively, the packet, frame, or other information can be generated by, or obtained by, the utility meter 105*b* for delivery or transmission to the utility server computer 130 or another network destination. For example, the packet, frame, or other information may comprise commodity consumption data or other utility meter 105*b* configuration information for delivery to the utility server computer 130 or another network destination. Many variations of packets, frames, or other information are available without departing from example embodiments of the invention.

Following block 305 is block 310. At block 310, the utility meter 105*b* may determine whether the destination of the packet, frame, or other information is a local destination for the utility meter 105*b*. For example, block 310 may determine whether the destination is a device in the HAN/LAN 110*b* associated with the utility meter 105*b*. To determine whether the destination is a local destination, block 310 may determine whether a destination address (e.g., IP address, MAC address, or other network address) associated with the packet, frame, or other information indicates a local device such as a network device 112*a-n* in HAN/LAN 110*b*.

If block 310 determines that the destination of the packet, frame, or other information is a local destination (e.g., in the HAN/LAN 110*b*), then processing may proceed to block 315. At block 315, the utility meter 105*h* may deliver or transmit the packet, frame, or other information via its network/communications interface for communicating with the local destination device. For example, the utility meter 105*b* may deliver or transmit the packet, frame, or other information to the appropriate one of the network devices 112*a-n* in HAN/LAN 110*b*.

On the other hand, block 310 may determine that the destination of the packet, frame, or other information is not a local destination. For example, the destination may be the utility server computer 130, another utility meter, or yet another network destination. In this case, processing may proceed to block 320. At block 320, the utility meter 105*b* may determine whether the first network and/or network/communications interface utilized for delivering the packet, frame, or other information is available, not congested, or otherwise operating normally or optimally. To do so, the utility meter 105*b* may access a table or record, perhaps stored in its memory or data files, of retransmissions, losses, communication times, error rates, and the like associated with the prior historical transmissions via the particular first network and/or network/communications interface. For example, a certain number of packet retransmissions or losses or a high error rate may indicate that a particular first network and/or network/communications interface such as a NAN network or interface is unavailable, congested, or not operating normally or optimally.

If block 320 determines that the first network and/or the network/communications interface normally utilized for delivering the packet, frame, or other information to its destination is available, uncongested, or otherwise operating normally or optimally, then processing may proceed to block 325. At block 325, the utility meter 105*b* may select the first network or the network/communications interface, and deliver the packet, frame, or other information via the first network or the network/communications interface, which may be a NAN interface, according to an example embodiment of the invention. Accordingly, the utility server computer 130 (or another network destination) may receive the transmitted packet, frame, or other information via any combination of NAN 115*b*. gateway computer 120*a* or other gateway computers, and WAN 125.

On the other hand, if block 320 determines that the particular first network and/or network/communications interface normally utilized for delivering the packet, frame, or other information to its destination is unavailable, congested, or otherwise not operating normally or optimally, then processing may proceed to block 330. At block 330, the utility meter 105b may determine whether an alternate route to the destination of the packet, frame, or other information is available via an alternate or second network or network/communications interface. For example, block 330 may determine whether the HAN/LAN 110b includes a routing device 410 that may reach, either directly or indirectly, the desired destination of the packet, frame, or other information, or a network associated therewith (e.g., the Internet).

If block 330 determines that an alternate route to the destination of the packet, frame, or other information is available via an alternate network or network/communications interface, then processing may proceed to block 335. At block 335, the utility meter 105b may select the alternate or second network or network/communications interface, and deliver or transmit the packet, frame, or other information via its alternate or second network/communications interface such as that used for communication with HAN/LAN 110b. As an example, the packet, frame, or other information can be delivered or transmitted via the alternate or second network/communications interface to the routing device 410 in HAN/LAN 110b. The routing device 410 can then retransmit the received packet, frame, or other information to the ultimate destination, or to another device, network, or computer in route to the ultimate destination. For example, the routing device 410 can deliver the received packet, frame, or other information to the utility server computer 130 via one or more combinations of WAN 125, gateway 405, or other intermediate computers without departing from example embodiments of the invention.

On the other hand, block 330 may determine that no alternate route to the destination of the packet, frame, or other information is available via an alternate or second network or network/communications interface. In this case, processing may return to block 320, where the packet, frame, or other information can be delivered at a later time when the normally used network/communications interface is operating normally (e.g., available, not congested, etc.).

Figure 5:
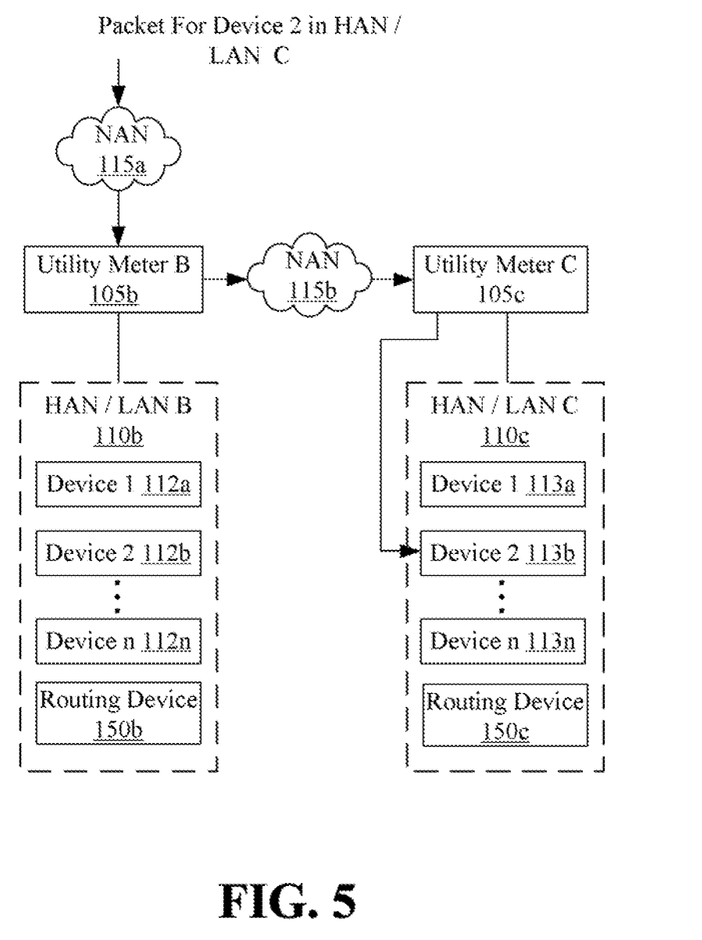
FIGS. 5-7 illustrate alternative data flows involving one or more example utility meters, according to an example embodiment of the invention.

FIG. 5 illustrates another data flow involving an example utility meter such as the utility meter 105b of FIG. 1. FIG. 5 will also be discussed in conjunction with the method 300 of FIG. 3. Turning now to FIGS. 3 and 5 at block 305, the utility meter 105b may receive a packet, frame, or other information from NAN 515a (e.g., 900 MHz or other wireless network) via its network communications interface. However, at block 310, a determination is made that the packet, frame, or other information is not destined for the HAN/LAN 110b associated with utility meter 105b. Instead, the packet, frame, or other information may be designated for delivery to utility meter 105c, or a network device 113a-n accessible via utility meter 105c and/or HAN/LAN 110c. In this case, processing may proceed from block 310 to block 320. Block 320 may determine that the availability of the network and/or network/communications interface utilized for delivering the packet, frame, or other information to the utility meter 105c, or a network device 113a-n, is accessible via utility meter 105c and/or HAN/LAN 110c. If the block 320 determines that the appropriate network and/or network/communications interface is available, not congested, or otherwise available, then processing may proceed to block 325. At block 325, the utility meter 105b may deliver the packet, frame, or other information via the network or network/communications interface to NAN 515b (e.g., a PLC or a wired NAN). Accordingly, the utility meter 105c may receive the transmitted packet, frame, or other information, which may in turn be delivered by the utility meter 105c to one of the network devices 113a-n in HAN/LAN 110c (e.g., a Zigbee or other wireless network). It will be appreciated that the destination network device 113a-n may be a routing device, which may be accessed for delivering information to a WAN such as WAN 125. On the other hand, block 320 may determine that the appropriate network and/or network/communications interface is not available, congested, or otherwise available, and processing may proceed to block 330. Block 330 may determine whether an alternate route is available, for example, via another network or network/communications interface to the utility meter 105c or a network device 113a-n. If so, then processing may proceed to block 335. As an example, at block 335, the packet, frame, or other information can be delivered or transmitted via an alternate network or network/communications interface to a routing device (e.g., device 410) in HAN/LAN 110b, for subsequent delivery to the utility meter 105e or a network device 113a-n.

Figure 6:
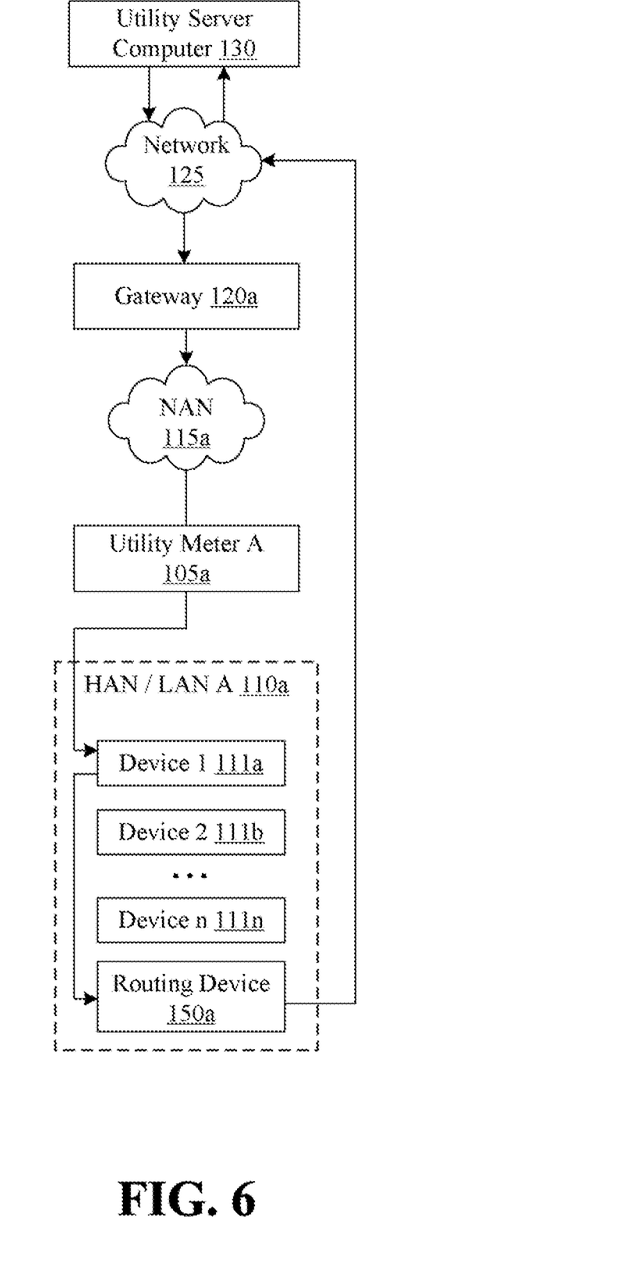

FIG. 6 illustrates another data flow involving an example utility meter such as the utility meter 105a of FIG. 1. In FIG. 6, a utility server computer 130 may need to communicate a packet, frame, or other information to device 111a. To do so, the utility server computer 130 can deliver the packet, frame, or other information to device 111a via the following example route: WAN 125→gateway computer 120a→NAN 115a→utility meter 105a→device 111a. Likewise, device 111a may need to communicate a response (e.g., in the form of a packet, frame, or other information) to the utility server computer 130. However, the device 111a may not be able to use the prior route used by the utility server computer 130, perhaps because of congestion or unavailability of a network or network component such as NAN 115a or gateway computer 120a. Accordingly, the device 111a can deliver the response to the utility server computer 130 via the following example alternate route: routing device 150a→WAN 125→utility server computer 130. It will be appreciated that many variations of the example route or alternate route are available without departing from example embodiments of the invention. For example, one or more of gateway computers 120b-n may be substituted for gateway computer 120a. Likewise, one or more of NANs 115b-n may be substituted for NAN 115a.

Figure 7:
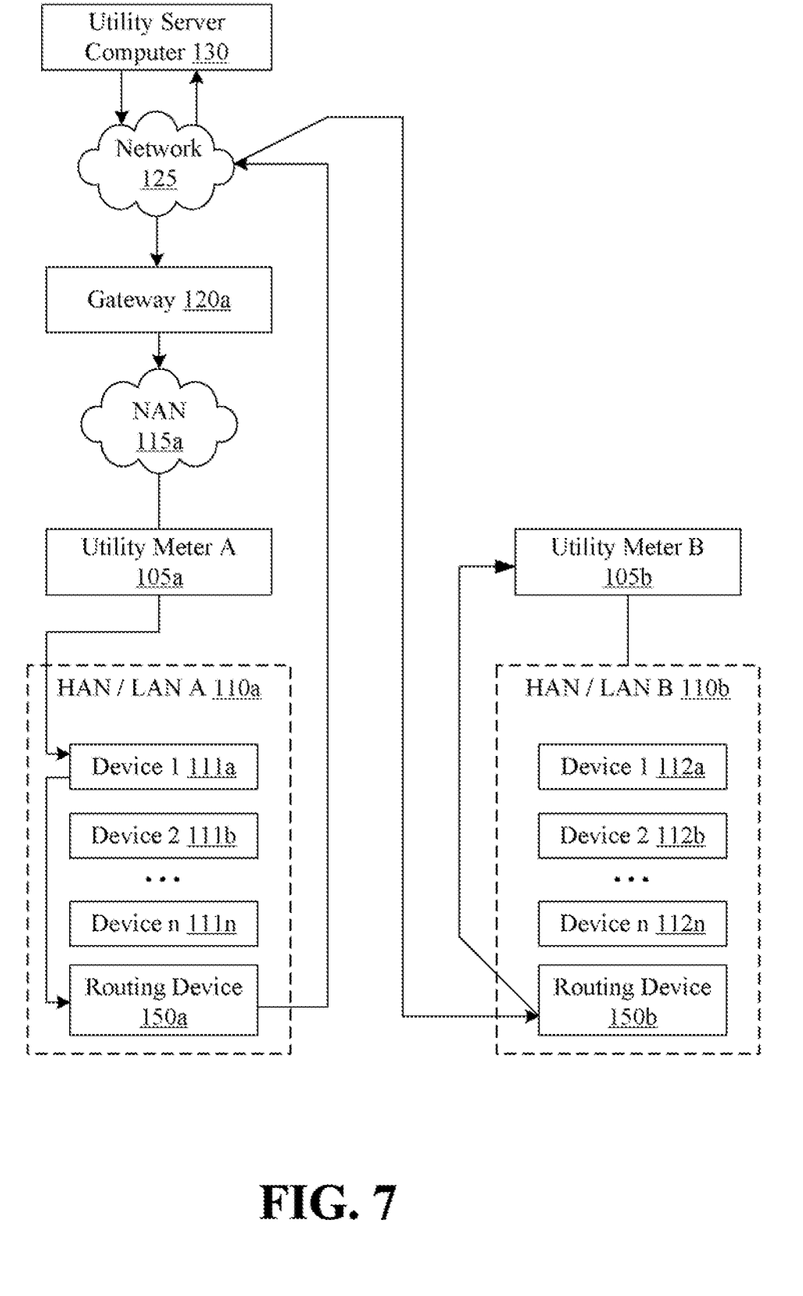

FIG. 7 illustrates another data flow involving example utility meters such as the utility meters 105a, 105b of FIG. 1. In FIG. 7, a utility server computer 130 may need to communicate a packet, frame, or other information to utility meter 105b. However, utility meter 105 may not be accessible via any of gateway computers 120a-n. In this case, the packet, frame, or other information can be delivered by a utility server computer 130 via an alternate route leveraging the routing device 150a in HAN/LAN 110a and the routing device 150b in HAN/LAN 11011. For example, the packet, frame, or other information can be delivered by a utility server computer 130 via the following example alternate route: WAN 125→gateway computer 120a→NAN 115a→utility meter 105a→routing device 150a→WAN 125→routing device 150b→utility meter 105b. Accordingly, in some example embodiments of the invention, utility meters 105a-n and HANs/LANs 110a-n can communicate with other network devices, including routing devices 150a-n, in providing routing or retransmission functionality, according to an example embodiment of the invention. It will be appreciated that many variations of the example alternate route are available without departing from example embodiments of the invention.

It will be appreciated that the packet, frame, or information communicated via the example routes or alternate routes described herein may include a variety of types of data that can be separated into one or more packets, frames, or information. As an example, these types of data can include meter readings, configuration information for a meter or network interface, demand response programs (e.g., for turning on or off certain devices based upon demand), and/or messages for display. Many variations of example data are available without departing from example embodiments of the invention.

It will be appreciated that many variations of FIGS. 3-7 are available without departing from example embodiments of the invention. However, in general, a utility meter may have at least two network/communications interfaces for accessing respective networks. In general, communications external to the utility meter and the associated HAN/LAN devices may be delivered via its primary external network/communications interface. When the primary external network/communications interface is congested or unavailable, the utility meter can determine if an alternate route is available via one or more alternative network/communications interfaces. As an example, the primary and alternate network/communications interfaces may be various combinations of wireless and wired communications interfaces connected to respective wireless and wired networks. Indeed, these wireless and wired networks may be various NANs, HANs/LANs, WANs, and other networks. Accordingly, when a primary network/communications interface is congested or unavailable, an alternate route may be obtained through another network/communications interface. For example, the primary network/communications interface may be connected to a first network (e.g., HAN/LAN, NAN, or WAN), while the alternate network/communications interface may be connected to a second network (e.g., HAN/LAN, NAN, or WAN). Accordingly, various paths or routes may be available to various network devices in or accessible via the first or second networks via either the primary network/communications interface or the alternate network/communications interface, according to an example embodiment of the invention.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A utility meter, comprising: a first communications interface for communicating with a destination via a first network, wherein the destination is at least one of a computer or another utility meter that is coupled to a wide area network (WAN), and wherein the first network is a neighborhood area network (NAN) in communication with the WAN; a second communications interface for communicating with the destination via a second network different from the first network, wherein the second network is a home area network (HAN) or a local area network (LAN) having a routing device in communication with the WAN; and at least one processor in communication with the first and second communications interfaces, the at least one processor configured to: receive or generate information for delivery to the destination; select the first communications interface when the first network is at least one of: a normally utilized network for delivering data to the destination, is available for use, or is uncongested; or select the second communications interface when the first network is at least one of: not available for use and is congested; and transmit the information to the destination via the selected communications interface.

2. The utility meter of claim 1, further comprising:
a sensor for measuring commodity consumption, wherein the transmitted information is associated with the measured commodity consumption.

3. The utility meter of claim 1, wherein the routing device is a router or gateway that provides Internet access.

4. The utility meter of claim 1, wherein when the second communications interface is selected, the information is delivered to the routing device in the HAN or LAN for subsequent delivery to the destination via the WAN.

5. The utility meter of claim 1, wherein the information is received via the first communications interface, wherein the second communications interface is further selected based upon an optimal route to the destination being available via the second communications interface.

6. The utility meter of claim 5, wherein the second communications interface is determined to have the optimal route to the destination based upon the first communications interface being associated with congestion or network unavailability.

7. The utility meter of claim 1, wherein the computer is a server computer associated with a utility company.

8. The utility meter of claim 1, wherein the first network and the second network are different ones of (i) a wired network, or (ii) a wireless network.

9. The utility meter of claim 1, wherein the first and second communications interfaces are different ones of: (i) a Home Area Network (HAN) interface, (ii) a ZigBee interface, (iii) a radio frequency (RF) network interface, (iv) a serial communication link interface, or (v) a local area network (LAN) interface.

10. The utility meter of claim 1, wherein the destination is accessible, either directly or indirectly, via the first network and the second network.

11. A method of operating a utility meter, the method comprising:
providing, for a utility meter, a first communications interface for communicating with a destination via a first network;
providing, for the utility meter, a second communications interface for communicating with the destination via a second network different from the first network;
receiving or generating, by the utility meter, information for delivery to the destination;
selecting the first communications interface when the first network is at least one of: a normally utilized network for delivering data to the destination, is available for use, or is uncongested;
or selecting the second communications interface when the first network is at least one of: not available for use or is congested; and
transmitting the information to the destination via the selected communications interface.

12. The method of claim 11, further comprising:
measuring commodity consumption by a sensor of the utility meter, wherein the transmitted information is associated with the measured commodity consumption.

13. The method of claim 11, wherein the routing device is a router or gateway that provides Internet access.

14. The method of claim 13, wherein when the second communications interface is selected, the information is delivered to the routing device in the HAN or LAN for subsequent delivery to the destination via the WAN.

15. The method of claim 11, wherein the information is received via the first communications interface, wherein the second communications interface is further selected based upon an optimal route to the destination being available via the second communications interface.

16. A system, comprising: a server computer; a plurality of utility meters in communication with the server computer, wherein each utility meter includes:
a first communications interface for communicating with a destination via a first network, wherein the destination is at least one of a computer or another utility meter that is coupled to a wide area network (WAN), and wherein the first network is a neighborhood area network (NAN) in communication with the WAN; a second communications interface for communicating with the destination via a second network different from the first network, wherein the second network is a home area network (HAN) or a local area network (LAN) having a routing device in communication with the WAN; and at least one processor in communication with the first and second communications interfaces, the at least one processor configured to: receive or generate information for delivery to the destination; select the first communications interface when the first network is at least
one of: a normally utilized network for delivering data to the destination, is available for use, or is uncongested; or select the second communications interface when the first network is at least one of: not available for use and is congested; and transmit the information to the destination via the selected communications interface.

* * * * *

UNITED STATES PATENT AND TRADEMARK OFFICE
CERTIFICATE OF CORRECTION

| | | |
|---|---|---|
| PATENT NO. | : 8,947,257 B2 | Page 1 of 1 |
| APPLICATION NO. | : 13/044079 | |
| DATED | : February 3, 2015 | |
| INVENTOR(S) | : Bradley Richard Ree | |

It is certified that error appears in the above-identified patent and that said Letters Patent is hereby corrected as shown below:

In the Specification

Column 8, Line 26 - Change "the utility meter 105h" to --the utility meter 105b--

Column 10, Line 20 - Change "the utility meter 105e" to --the utility meter 105c--

Column 10, Line 55 - Change "in HAN/LAN 11011" to --in HAN/LAN 110b--

In the Claims

Column 13, Claim 11, Line 39 - Change "network;" to --network,-- and insert --wherein the destination is at least one of a computer or another utility meter that is coupled to a wide area network (WAN), and wherein the first network is a neighborhood area network (NAN) in communication with the WAN;--

Column 13, Claim 11, Line 42 - Change "network;" to --network,-- and insert --wherein the second network is a home area network (HAN) or a local area network (LAN) having a routing device in communication with the WAN;--

Column 14, Claim 11 continued, Line 2 - Replace "or" with --and--

Signed and Sealed this
Eighth Day of September, 2015

Michelle K. Lee
*Director of the United States Patent and Trademark Office*

UNITED STATES PATENT AND TRADEMARK OFFICE
CERTIFICATE OF CORRECTION

PATENT NO. : 8,947,257 B2  Page 1 of 1
APPLICATION NO. : 13/044079
DATED : February 3, 2015
INVENTOR(S) : Ree It is certified that error appears in the above-identified patent and that said Letters Patent is hereby corrected as shown below:

In the specification

In Column 4, Line 52, delete "105h," and insert -- 105b, --, therefor.

In Column 6, Line 38, delete "FIG. 1" and insert -- FIG. 1. --, therefor.

In Column 8, Line 66, delete "115b. gateway" and insert -- 115b, gateway --, therefor.

In Column 9, Line 47, delete "FIGS. 3 and 5" and insert -- FIGS. 3 and 5, --, therefor.

Signed and Sealed this
Twenty-third Day of February, 2016

Michelle K. Lee
*Director of the United States Patent and Trademark Office*